(12) United States Patent
Kawamoto et al.

(10) Patent No.: US 8,855,897 B2
(45) Date of Patent: Oct. 7, 2014

(54) VEHICLE START CONTROL APPARATUS

(75) Inventors: Takayoshi Kawamoto, Tokyo (JP); Sumiaki Hazama, Tokyo (JP); Takashi Ue, Tokyo (JP); Tadao Ohwaki, Okazaki (JP); Yusuke Nomura, Okazaki (JP)

(73) Assignees: Mitsubishi Jidosha Kogyo Kabushiki Kaisha, Tokyo (JP); Mitsubishi Jidosha Engineering Kabushiki Kaisha, Okazaki-Shi (JP)

( * ) Notice: Subject to any disclaimer, the term of this patent is extended or adjusted under 35 U.S.C. 154(b) by 216 days.

(21) Appl. No.: 13/394,416

(22) PCT Filed: Nov. 10, 2010

(86) PCT No.: PCT/JP2010/070024
§ 371 (c)(1),
(2), (4) Date: Apr. 5, 2012

(87) PCT Pub. No.: WO2011/059001
PCT Pub. Date: May 19, 2011

(65) Prior Publication Data
US 2012/0283937 A1    Nov. 8, 2012

(30) Foreign Application Priority Data

Nov. 10, 2009    (JP) ................................. 2009-256915

(51) Int. Cl.
*F02N 11/08* (2006.01)
*F02N 11/10* (2006.01)
*F02D 29/02* (2006.01)

(52) U.S. Cl.
CPC ....... *F02N 11/0822* (2013.01); *F02N 2200/101* (2013.01); *Y02T 10/48* (2013.01)
USPC ........................................ 701/113; 123/179.3

(58) Field of Classification Search
USPC ............ 701/113, 112, 102; 123/179.2, 179.3, 123/179.24
See application file for complete search history.

(56) References Cited

U.S. PATENT DOCUMENTS

| | | | |
|---|---|---|---|
| 5,742,137 A * | 4/1998 | Bratton et al. | 318/139 |
| 2005/0247280 A1 * | 11/2005 | Asada et al. | 123/179.3 |
| 2006/0258508 A1 * | 11/2006 | Tanioka et al. | 477/203 |
| 2007/0245998 A1 * | 10/2007 | Yamaguchi et al. | 123/179.25 |
| 2007/0261653 A1 | 11/2007 | Yagyu | |
| 2010/0057332 A1 * | 3/2010 | Katoh et al. | 701/113 |

FOREIGN PATENT DOCUMENTS

| | | |
|---|---|---|
| EP | 2 028 354 A2 | 2/2009 |
| JP | 2006-283727 A | 10/2006 |
| JP | 2007-303427 A | 11/2007 |
| JP | 2010-019207 A | 1/2010 |
| WO | 2009-052438 A | 3/2009 |

* cited by examiner

*Primary Examiner* — Mahoud Gimie
(74) *Attorney, Agent, or Firm* — Birch, Stewart, Kolasch & Birch, LLP (57) ABSTRACT

An apparatus includes a first switch turned ON in response to depression of a pedal, and OFF in response to depression being released; a second switch that assumes a first state in response to depression of the pedal, and a second state in response to pedal release; and a control unit that determines whether the first switch is in the first state. The control unit starts the engine, if in the first state and if the engine start switch is operated.

7 Claims, 9 Drawing Sheets

VEHICLE START CONTROL APPARATUS

TECHNICAL FIELD

The present invention relates to a vehicle start control apparatus.

BACKGROUND ART

A so-called push start engine start system has been known, wherein a driver can start an engine by pressing a push start switch while depressing a brake pedal (refers to Patent Reference 1, for example). With such a system, even if depression of the brake pedal is not detected for some reasons, the driver can start the engine by pressing and holding the start switch.

CITATION LIST

Patent Literature

Patent Reference 1: Japanese Laid-open Patent Publication No. 2006-283727

SUMMARY

Technical Problem

In a situation where depression of the brake pedal is continued to be detected for some reasons even if it is not actually depressed, a false start of the engine must be prevented. However, the system as described above does not handle such a situation.

The present invention was conceived of in view of the above issue, and an object thereof is to provide a vehicle start control apparatus that can prevent the engine from being falsely started in a situation where depression of the brake pedal is continued to be detected for some reasons even if the brake pedal is not actually depressed.

Solution to Problem

In order to achieve the above object, a vehicle start control apparatus according to the present invention is a vehicle start control apparatus that starts an engine when an engine start switch is operated while a pedal is being depressed, the vehicle start control apparatus including: a first switch that is turned ON in response to a depression of the pedal, and is turned OFF in response to the depression of the pedal being released; a second switch that assumes a first state being one of ON and OFF in response to the depression of the pedal, and assumes a second state being the other of ON and OFF in response to the depression of the pedal being released; and a control unit that performs a first determination to determine whether or not the first switch is ON and the second switch is in the first state; starts the engine if a positive determination is made in the first determination and if the engine start switch is operated; and after determining whether or not the pedal is depressed twice by determining whether or not the first switch or the second switch changes from ON to OFF, and then to ON, or from OFF to ON, and then to OFF after a negative determination is made in the first determination, starts the engine, if it is determined that one of the first switch and the second switch used for the determination of whether the pedal is depressed twice indicates the depression of the pedal and if the engine start switch is operated.

A second vehicle start control apparatus of the present invention is a vehicle start control apparatus that starts an engine when an engine start switch is operated while a pedal is being depressed, the vehicle start control apparatus including: a first switch that is turned ON in response to a depression of the pedal, and is turned OFF in response to the depression of the pedal being released; a second switch that assumes a first state being one of ON and OFF in response to the depression of the pedal, and assumes a second state being the other of ON and OFF in response to the depression of the pedal being released; and a control unit that performs a third determination to determine whether or not the first switch is ON and the second switch is in the first state; starts the engine, if a positive determination is made in the third determination and if the engine start switch is operated; and after determining whether or not the pedal is depressed twice by determining whether or not the first switch or the second switch changes from ON to OFF, and then to ON, or from OFF to ON, and then to OFF after a negative determination is made in the third determination, performs a fourth determination to determine whether or not the first switch is ON and the second switch is in the second state, and starts the engine, if a positive determination is made in the fourth determination and if the engine start switch is operated.

In the above-described vehicle start control apparatus, the control unit, after determining whether or not the pedal is depressed twice by determining whether or not the first switch or the second switch changes from ON to OFF, and then to ON, or from OFF to ON, and then to OFF after the negative determination is made in the third determination, perform a fifth determination to determine whether or not the first switch is OFF and the second switch is in the first state, and start the engine if a positive determination is made in the fifth determination and if the engine start switch is operated.

In the above-described vehicle start control apparatuses, the first switch may be a stop lamp switch to turn on or off a stop lamp, and the second switch may be a brake switch to disable a cruise control function in the first state.

In the above-described vehicle start control apparatuses, the first switch may be a clutch interlock switch to electrically connect or disconnect between a starter motor and a power source, and the second switch may be a clutch monitoring switch to disable a cruise control function in the first state.

Advantageous Effect of Invention

The vehicle start control apparatus according to the present invention can prevent the engine from being falsely started in a situation where depression of the brake pedal is continued to be detected for some reasons even if the brake pedal is not actually depressed.

REFERENCE SIGN LIST

10 VEHICLE START CONTROL APPARATUS
12 BRAKE PEDAL
14 PUSH START SWITCH
16 FOB KEY
18 STEERING LOCK MECHANISM
20 OSS ECU (CONTROL UNIT)
22 STOP LAMP SWITCH (FIRST SWITCH)
24 BRAKE SWITCH (SECOND SWITCH)
26 ACC RELAY
28 IG RELAY
30 STARTER RELAY
32 ACC
34 BATTERY
36 IG PLUG
38 STARTER MOTOR
40 KOS ECU
42 FOB BOX
44 ANTENNA
46 BUZZER
48 CAN
50 ENGINE ECU
52 ELECTRIC PARTS ECU
54 STOP LAMP
100 VEHICLE START CONTROL APPARATUS
122 CLUTCH INTERLOCK SWITCH (FIRST SWITCH)
124 CLUTCH MONITORING SWITCH (SECOND SWITCH)

[Description of Embodiments]

Hereinafter, embodiments of the present invention will be described with reference to the drawings.

(First Embodiment)

FIGS. 1 to 4 illustrate a vehicle start control apparatus as a first embodiment of the present invention, which will be described with reference to the drawings.

Figure 1:
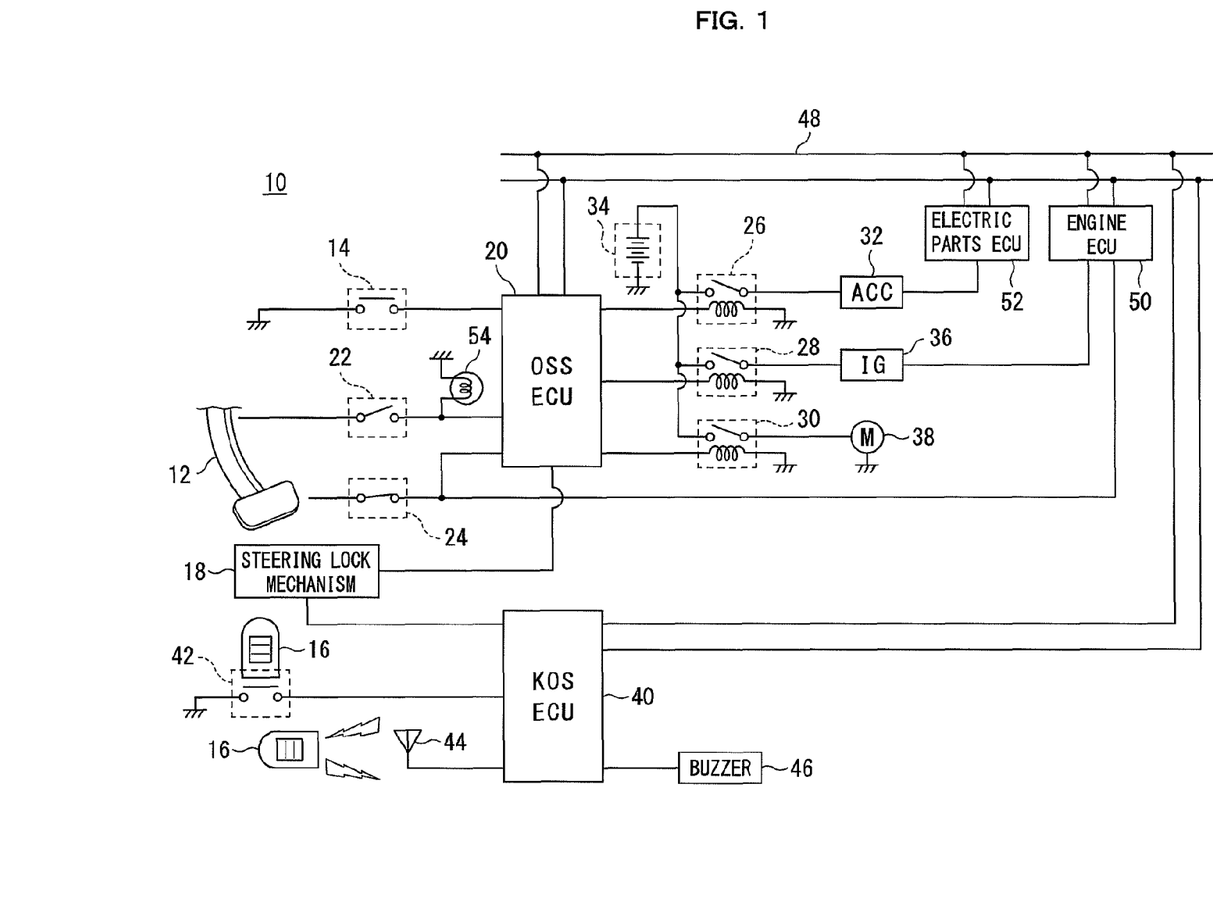
FIG. 1 is a block diagram illustrating the configuration of a vehicle start control apparatus according to a first embodiment of the present invention.

FIG. 1 is a block diagram illustrating a configuration of a vehicle start control apparatus according to an embodiment of the present invention. As shown in FIG. 1, a vehicle start control apparatus 10 according to this embodiment is an apparatus used in an AT (Automatic Transmission) vehicle, wherein a so-called one push start system (hereinafter, referred to as the "OSS") and a so-called Keyless Operation System (hereinafter, referred to as the "KOS") are employed. More specifically, the vehicle start control apparatus 10 starts an engine in response to a depression of a push start switch 14 while a brake pedal 12 is being depressed by a driver, by means of the OSS. The vehicle start control apparatus 10 also unlocks a steering lock mechanism 18 to permit operations of the steering by means of the KOS, once a portable electronic key (hereinafter, referred to as the "FOB key") 16 is authenticated.

The vehicle start control apparatus 10 includes an OSS ECU (electronic control unit, control unit) 20 that controls start of the engine, powering on and off of accessories (hereinafter, referred to as "ACC") 32, an ignition plug (hereinafter, referred to as the "IG plug") 36 of the vehicle, and the like, and the push start switch 14, a stop lamp switch 22, a brake switch 24, the steering lock mechanism 18, an ACC relay 26, an IG relay 28, and a starter relay 30, which are connected to OSS ECU 20. The vehicle start control apparatus 10 also includes a KOS ECU 40 that authenticates the FOB key 16 and controls the steering lock mechanism 18, and an FOB box 42, an antenna 44, and a buzzer 46, which are connected to the KOS ECU 40. It is noted that the steering lock mechanism 18 is also connected to the KOS ECU 40. The vehicle start control apparatus 10 also includes an engine ECU 50 and an electric parts ECU 52 connected to the OSS ECU 20 via a CAN (control area network) 48.

The push start switch 14 is a push-type switch disposed on an instrument panel in front of the driver's seat, and is turned on in response to a depression of a pressed portion by the driver. The push start switch 14 includes a warning light integrated therein. This warning light is lit on or off under the control of the OSS ECU 20.

The FOB key 16 is a portable transmitter which is attached to or detached from the FOB box 42. When the FOB key 16 is attached to the FOB box 42, ID information is communicated between the FOB key 16 and the KOS ECU 40. When the FOB key 16 is not attached to the FOB box 42, the ID information is communicated between the FOB key 16 and the KOS ECU 40 through wireless communications between the FOB key 16 and the antenna 44.

The steering lock mechanism 18 is a mechanism to prohibit the steering from being operated by locking the steering, or permits the operation by unlocking the steering. The steering lock mechanism 18 is controlled by the KOS ECU 40, depending on a result of matching of the ID information in the FOB key 16.

The stop lamp switch 22 is a switch which is turned ON while the brake pedal 12 is being depressed, or is turned OFF while the brake pedal 12 is not depressed. In response to the stop lamp switch 22 turning ON, a battery 34 and a stop lamp 54 are electrically connected each other and the stop lamp 54 is turned on.

The stop lamp switch 24 is a switch which is turned OFF (a first state) while the brake pedal 12 is being depressed, or is turned ON (a second state) while the brake pedal 12 is not depressed. The engine ECU 50 performs a so-called cruise control to maintain a vehicle speed to a preset value while the brake switch 24 is ON.

The ACC relay 26 is disposed in a circuit connecting the battery 34 to the ACC 32, and electrically connects or disconnects between the battery 34 and the ACC 32 under the control of the OSS ECU 20. It is noted that the ACC 32 includes audio devices, lighting, such as the room lamp, and the air conditioning apparatus of the vehicle.

The IG relay 28 is disposed in a circuit connecting the battery 34 to the IG plug 36, and electrically connects or disconnects between the battery 34 and the IG plug 36 under the control of the OSS ECU 20. The starter relay 30 is disposed in a circuit connecting the battery 34 to the starter motor 38, and electrically connects or disconnects between the battery 34 and the starter motor 38 under the control of the OSS ECU 20.

The FOB box 42 is disposed on the instrument panel in front of the driver's seat, and includes a switch that is turned on in response to the FOB key 16 being inserted to the FOB box 42. Once that switch is turned on, the ID information is communicated between the FOB key 16 and the KOS ECU 40. The antenna 44 is disposed on the instrument panel in the cabin of the vehicle, for example, and wirelessly communicates the ID information with the FOB key 16. The buzzer 46 is an audio producing device for issuing a warning sound outside the cabin, and is controlled by the KOS ECU 40, depending on a result of matching of the ID information in the FOB key 16.

The KOS ECU 40 unlocks the steering lock mechanism 18 if ID information that has been stored in advance matches ID information received from the FOB key 16, and when the push start switch 14 is turned on while the stop lamp switch 22 is ON. The KOS ECU 40 instructs the buzzer 46 to issue the warning sound if the ID information that has been stored in advance does not match the ID information received from the FOB key 16, and when the stop lamp switch 22 and the push start switch 14 are turned on.

Figure 2:
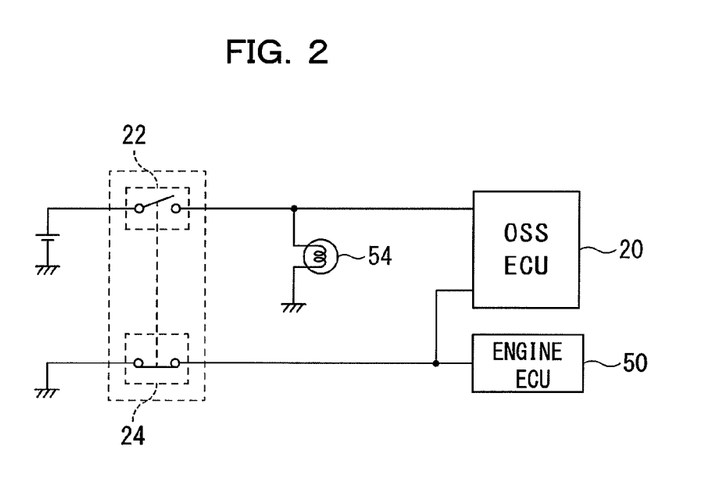
FIG. 2 is a block diagram illustrating the configuration of an OSS of the vehicle start control apparatus according to the first embodiment of the present invention.

FIG. 2 is a block diagram illustrating the configuration of the OSS of the vehicle start control apparatus 10. As shown in this diagram, the stop lamp switch 22 and the brake switch 24 are switches turned on or off in conjunction with operation of the brake pedal 12. The stop lamp switch 22 and the brake switch 24 are toggle switches turned on or off in conjunction with each other. More specifically, the brake switch 24 is turned off when the stop lamp switch 22 is ON, whereas the brake switch 24 is turned on when the stop lamp switch 22 is OFF.

Thus, when the brake pedal 12 is depressed, the stop lamp switch 22 is turned on and the brake switch 24 is turned off. In this case, the stop lamp 54 is lit on and the cruise control by the engine ECU 50 is disabled. In contrast, when the brake pedal 12 is not depressed, the stop lamp switch 22 is turned off and the brake switch 24 is turned on. In this case, the stop lamp 54 is lit off and the cruise control by the engine ECU 50 is enabled.

The OSS ECU 20 stores a control program for performing a start control on the vehicle, depending on whether the stop lamp switch 22 and the brake switch 24 are ON or OFF. The start control of the vehicle is performed by the OSS ECU 20 in accordance with the control program.

The KOS ECU 40 performs matching on the ID information in the FOB key 16, and the OSS ECU 20 initiates the start control of the vehicle if the prestored ID information matches the received ID information.

It is noted that the OSS ECU 20 stores how ON/OFF of the two switches 22 and 24 has been changed after the vehicle start control was initiated, as a history.

The OSS ECU 20 permits start of the engine if the push start switch 14 is ON when the stop lamp switch 22 is ON and the brake switch 24 is OFF, thereby starting the engine.

In contrast, the OSS ECU 20 sets NG flags for the two switches 22 and 24 to ON if the stop lamp switch 22 is ON and the brake switch 24 is not OFF (if a negative determination is made in a first determination which will be described later). The OSS ECU 20 then executes the warning processing. The OSS ECU 20 does not permit start of the engine in this case.

After execution of the warning processing described above, when the stop lamp switch 22 changes from ON to OFF, and then to ON, in this order, the OSS ECU 20 sets the NG flag only for the stop lamp switch 22 to OFF. When the brake switch 22 changes from OFF to ON, and then to OFF, in this order, the OSS ECU 20 sets the NG flag only for the brake switch 24 to OFF.

If the NG flags of the switches 22 and 24 are both OFF, the OSS ECU 20 terminates the warning processing, and permits start of the engine if the push start switch 14 is ON.

On the other hand, if one of the NG flags of the switches 22 and 24 is ON, the OSS ECU 20 continues execution of the warning processing, instead of terminating it, and permits start of the engine if the push start switch 14 is ON.

Further, in the present embodiment, the vehicle start control is performed based on the determination whether the stop lamp switch 22 and the brake switch 24 are ON or OFF as described above, the vehicle start control may be performed based on determination whether a clutch interlock switch 122 and clutch monitoring switch 124, which will be described later in the third embodiment, are ON or OFF, in place of using the switches 22 and 24.

Since the start control apparatus for a vehicle according to the first embodiment of the present invention is configured as described above, controls as shown in FIGS. 3 and 4, for example, are performed by the OSS ECU (control unit) 20. These control flows are performed periodically, for example, at every dozens of milliseconds.

Figure 3:
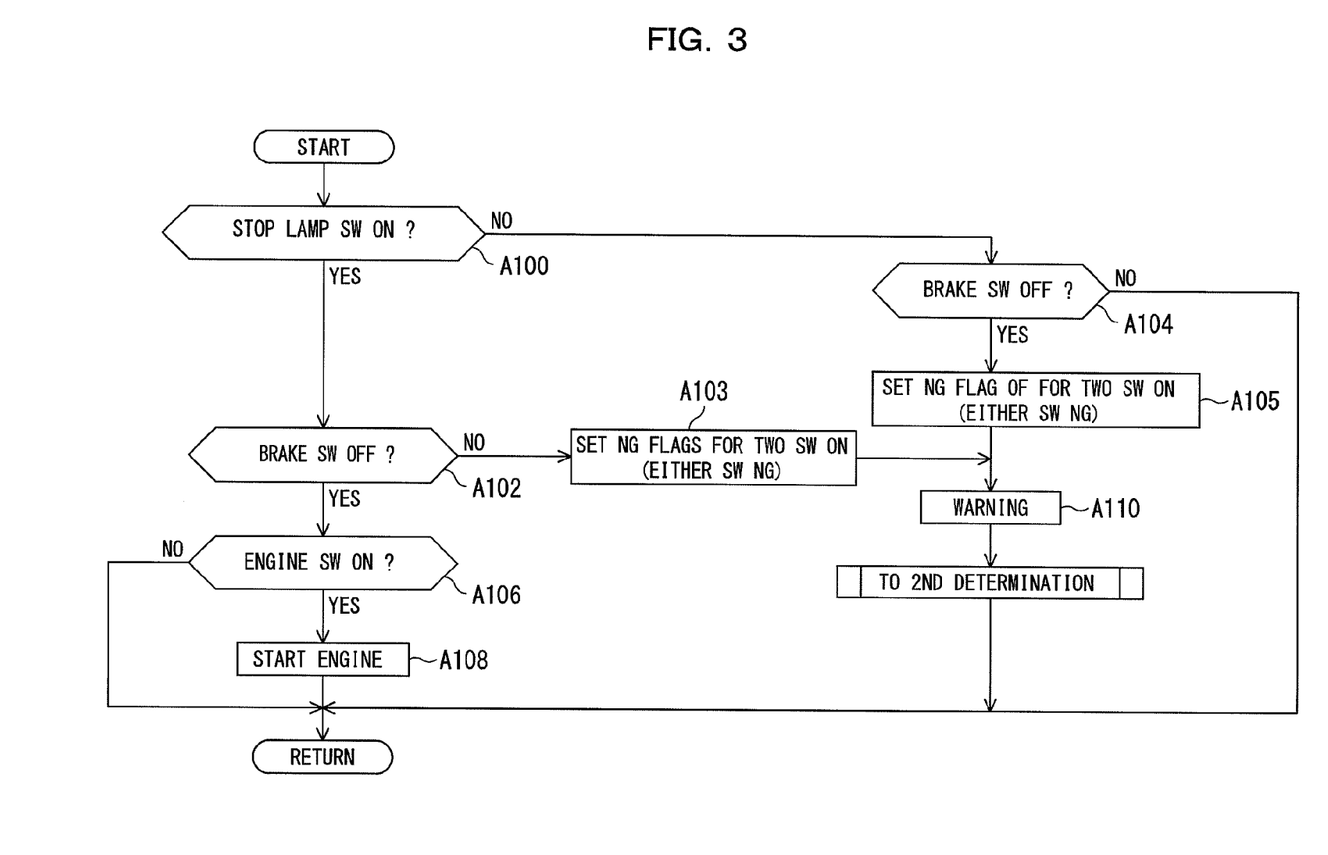
FIG. 3 is a flowchart illustrating a method of controlling a start of a vehicle according to the first embodiment of the present invention.

This processing routine is initiated if the KOS ECU 40 performs matching on the ID information in the FOB key 16 and the prestored ID information matches the received ID information, and if the engine has not been started. Further, once the engine is started, this processing routine is terminated. This processing routine is also performed only for a certain period of time after the routine is initiated. First, the flow transitions to Step A100. In Step A100, the OSS ECU 20 determines whether or not the stop lamp switch 22 is ON. If a positive determination is made in this step, the flow transitions to Step A102. Otherwise, if a negative determination is made, the flow transitions to Step A104.

In Step A102, the OSS ECU 20 determines whether or not the brake switch 24 is OFF. If a positive determination is made in this step, the flow transitions to Step A106. Otherwise, if a negative determination is made, the flow transitions to Step A103 wherein the NG flags for the two switches 22 and 24 are set to ON. After performing a warning in Step A110, the flow transitions to a second determination.

On the other hand, in Step A104, the OSS ECU 20 determines whether or not the brake switch 24 is OFF. If a positive determination is made in this step, the flow transitions to Step A105. Otherwise, if a negative determination is made, the current processing routine is terminated.

In Step A105, after the NG flags for the two switches 22 and 24 are set to ON. After performing the warning in Step A110, the flow transitions to the second determination.

In other words, in Steps A100-102, the OSS ECU 20 determines whether or not the stop lamp switch 22 is ON and the brake switch 24 is OFF. Here, in Step A100-102, the OSS ECU 20 determines whether the stop lamp switch 22 and the brake switch 24 are turned on or off in response to a depression of the brake pedal 12, that is, whether the stop lamp switch 22 and the brake switch 24 are both functioning properly. If a positive determination is made in the determination in Steps A100-102 (first determination), the flow transitions to Step A106. Otherwise, if a negative determination is made, the flow transitions to Step A103 or Step A104.

In Step A106, the OSS ECU 20 determines whether or not the push start switch 14 is ON. If a positive determination is made, the flow transitions to Step A108. Otherwise, if a negative determination is made, the current processing routine is terminated. In Step A108, the OSS ECU 20 electrically connects the ACC 32, the IG plug 36, and the starter motor 38 to the battery 34 by energizing the ACC relay 26, the IG relay 28, and the starter relay 30 to operate the ACC 32, the IG plug 36, and the starter motor 38. Once the IG plug 36 and the starter motor 38 are operated, the engine is started. With that the processing routine is completed at this step.

More specifically, if the stop lamp switch 22 properly changes from OFF to ON in response depression of the brake pedal 12, and the brake switch 24 properly changes from ON to OFF in conjunction with the stop lamp switch 22, the OSS ECU 20 permits start of the engine.

In contrast, the NG flags for the two switches 22 and 24 are set to ON for storing a failure state of any of the switches 22 and 24 in Step A103. After performing the processing in Step A110, the flow transition to the second determination.

Further, in Step A104, the OSS ECU 20 determines whether or not the brake switch 24 is OFF. If a negative determination is made in this step, the current processing routine is terminated. Otherwise, if a positive determination is made in this step, the flow transitions to Step A105.

In Step A105, the NG flags for the two switches 22 and 24 are set to ON, for storing a failure state of any of the switches 22 and 24. Thereafter, in Step A110, the OSS ECU 20 performs the warning processing (WARNING) to turn on the warning light integrated in the push start switch 14, and transitions to the second determination.

In other words, it is considered that either of the switches 22 and 24 has failed if the stop lamp switch 22 is OFF and the brake switch 24 is OFF. The failure flags (NG flags) for the two switches 22 and 24 are set to ON and the flow transitioned to the second determination. Similarly, it is considered that either of the switches 22 and 24 has failed if the stop lamp switch 22 is ON and the brake switch 24 is ON. The failure flags (NG flags) for the two switches 22 and 24 are set to ON and the flow transitioned to the second determination.

The NG flags for the two switches are set to ON in Steps A103 and A104 for the following reason. If the brake switch 24 is ON and a negative determination is made in Step A102 while the brake pedal 12 is not depressed, for example, the brake switch 24 is turned ON properly (without being fixed) while the stop lamp switch 24 is fixed to ON (failed), since the brake pedal 12 is not depressed. On the other hand, if a negative determination is made in Step A102 while the brake pedal 12 is being depressed, the stop lamp switch 22 is turned ON properly (without being fixed) while the brake switch 24 is fixed to ON, since the brake pedal 12 is depressed. Thus, if one of these negative determinations is made, the NG flags for the two switches 22 and 24 are set to ON, since which of the switch 22 or the switch 24 fails cannot be determined. Similarly, if it is determined that the stop lamp switch 22 is OFF in Step A100, the NG flags for the two switches 22 and 24 are set to ON in the Step A105, since which of the switch 22 or the switch 24 fails cannot be determined.

Figure 4:
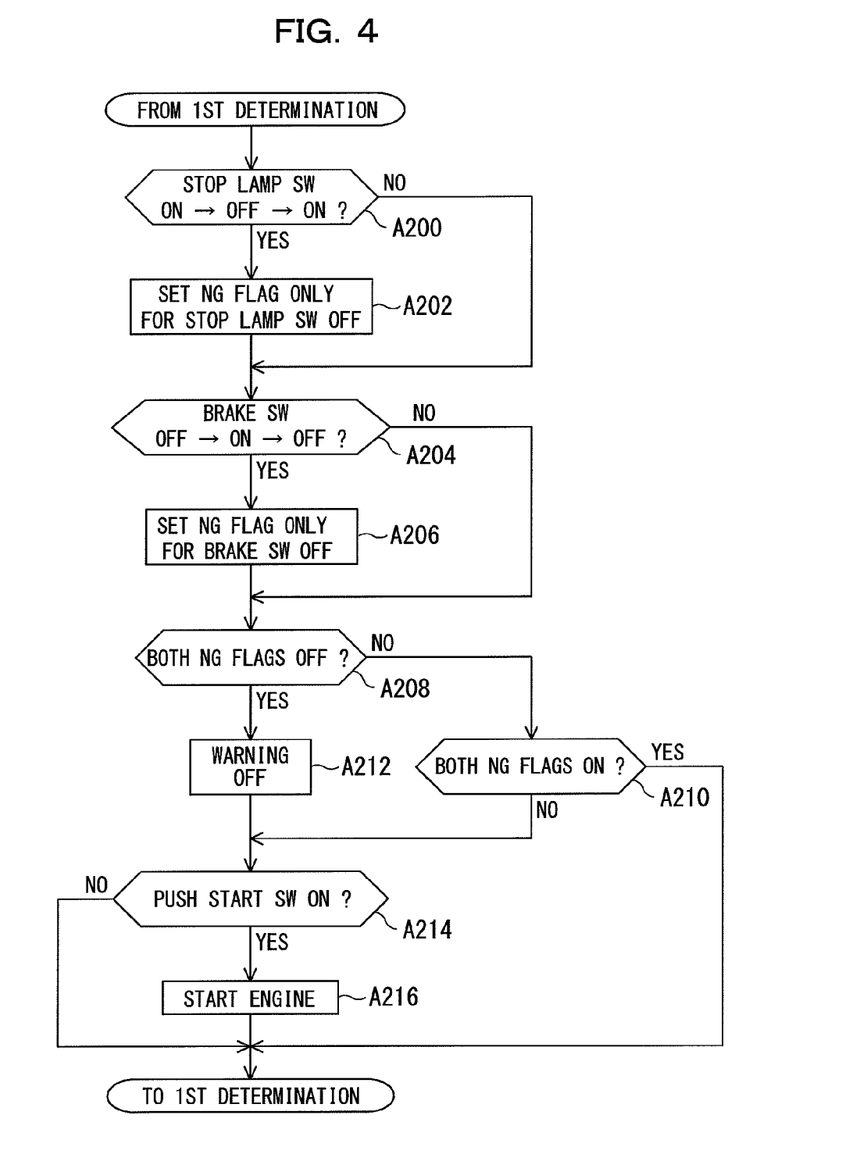
FIG. 4 is a flowchart illustrating a method of controlling a start of a vehicle according to the first embodiment of the present invention.

As shown in the flowchart in FIG. 4, in the second determination, in Step A200, the OSS ECU 20 determines whether the stop lamp switch 22 changes from ON to OFF, and then to ON, in this order, for checking whether the user has depressed the brake pedal 12 again. If a positive determination is made, the flow transitions to Step A202. Otherwise, if a negative determination is made, the flow transitions to Step A204. Since the output from the stop lamp switch 22 changes from ON to OFF, and then to ON in response to the user depressing the brake pedal 12 again, it can be confirmed that the stop lamp switch 22 is not fixed to OFF or fixed to ON. Incidentially that determination in this Step A200 can be made by the OSS ECU 20, by referring to the stored history of the change of the stop lamp switch 22, from ON to OFF, and from OFF to ON, for example.

In Step A202, only the NG flag for the stop lamp switch 22 is set to OFF. The flow then transitions to Step A204.

In Step A204, it is determined whether the brake switch 24 changes from OFF to ON, and then to OFF. If a positive determination is made, the flow transitions to Step A206. Otherwise, if a negative determination is made, the flow transitions to Step A208. Since the output from the brake switch 22 changes from OFF to ON, then to OFF in response to the user depressing the brake pedal 12 again, it can be confirmed that the brake switch 22 is not fixed to OFF or fixed to ON. Similarly, that determination in this Step A200 can be made by the OSS ECU 20, by referring to the stored history indicating how ON/OFF of the brake switch 22 changes.

In Step A206, only the NG flag for the brake switch 24 is set to OFF. The flow then transitions to Step A208.

In Step A208, it is determined whether the NG flag for the stop lamp switch 22 and the NG flag for the brake switch 24 are both OFF. If a positive determination is made in Step A208, the flow transitions to Step A212. If a negative determination is made, the flow transitions to Step A210. If a positive determination is made in Step A200 and a positive determination is made in Step A204, a positive determination is made in Step A208. If a negative determination is made at least one of Steps A200 and A204, a negative determination is made in Step A208.

In Step A210, it is determined whether the NG flag for the stop lamp switch 22 and the NG flag for the brake switch 24 are both ON. If a positive determination is made, the flow transitions to the first determination and the current processing routine is terminated. If a negative determination is made, the flow transitions to Step A214. If a negative determination is made in Step A200 and a negative determination is made in Step A204, a positive determination is made in Step A210. If a positive determination is made in at least one of Steps A200 and A204, a negative determination is made in Step A210.

In Step A212, the warning processing is terminated, and the flow transition to Step A214.

In Step A214, it is determined whether or not the push start switch 14 has been ON for a predetermined period of time. If a positive determination is made, an engine start is permitted in Step A216 and this processing routine is terminated. If a negative determination is made, the flow transitions to the first determination and the current processing routine is terminated.

Either of the determination of the change in ON/OFF state of the stop lamp switch 22 in Steps A200-Step A202 and the determination of the change in ON/OFF state of the brake switch 24 in Step A204-Step A206 may be performed first. After the determination of the change in the state of the brake switch 24, the change in the state of the stop lamp switch 22 may be determined.

Accordingly, the vehicle start control apparatus 10 according to this embodiment can prevent the engine from being started, bypassing execution of the warning processing, when the brake pedal 12 is not depressed. Further, if either the stop lamp switch 22 or the brake switch 24 fails, the warning processing is performed and start of the engine can be permitted when the user depresses the brake pedal 12 once again and the push start switch 14 is operated.

Further, it is possible to prevent start of the engine from being continuously blocked even when the brake pedal 12 is depressed due to a failure of the stop lamp switch 22, if a negative determination is made in Step A200 and a positive determination is made in Step A204, that is, if the OSS ECU 20 determines that the stop lamp switch 22 fails while the brake switch 24 is operating correctly in response to the second depression of the brake pedal 12.

Further, it is possible to prevent start of the engine from being continuously blocked even when the brake pedal 12 is depressed due to a failure of the stop lamp switch 22, if a positive determination is made in Step A200 and a negative determination is made in Step A204, that is, if the OSS ECU 20 determines that the brake switch 22 fails while the stop lamp switch 22 is operating correctly in response to the second depression of the brake pedal 12.

Further, a failure of the stop lamp switch 22 or the brake switch 24 can be detected based on two depressions of the brake pedal 12, i.e., an operation routinely made by the driver, rather than special operations, such as a depression of the push start switch 14 for longer than a predetermined period of time (so-called "press and hold"). Accordingly, the drive's operation can be simplified for starting the engine when either of the switches 22 and 24 fails.

In addition, even when either of the switches 22 and 24 fails and pressing of either of the switches 22 and 24 is not detected while the brake pedal 12 is depressed, start of the engine can be permitted by determining that the other switch 22 or 24 functions properly (does not fail).

(Second Embodiment)

Figure 5:
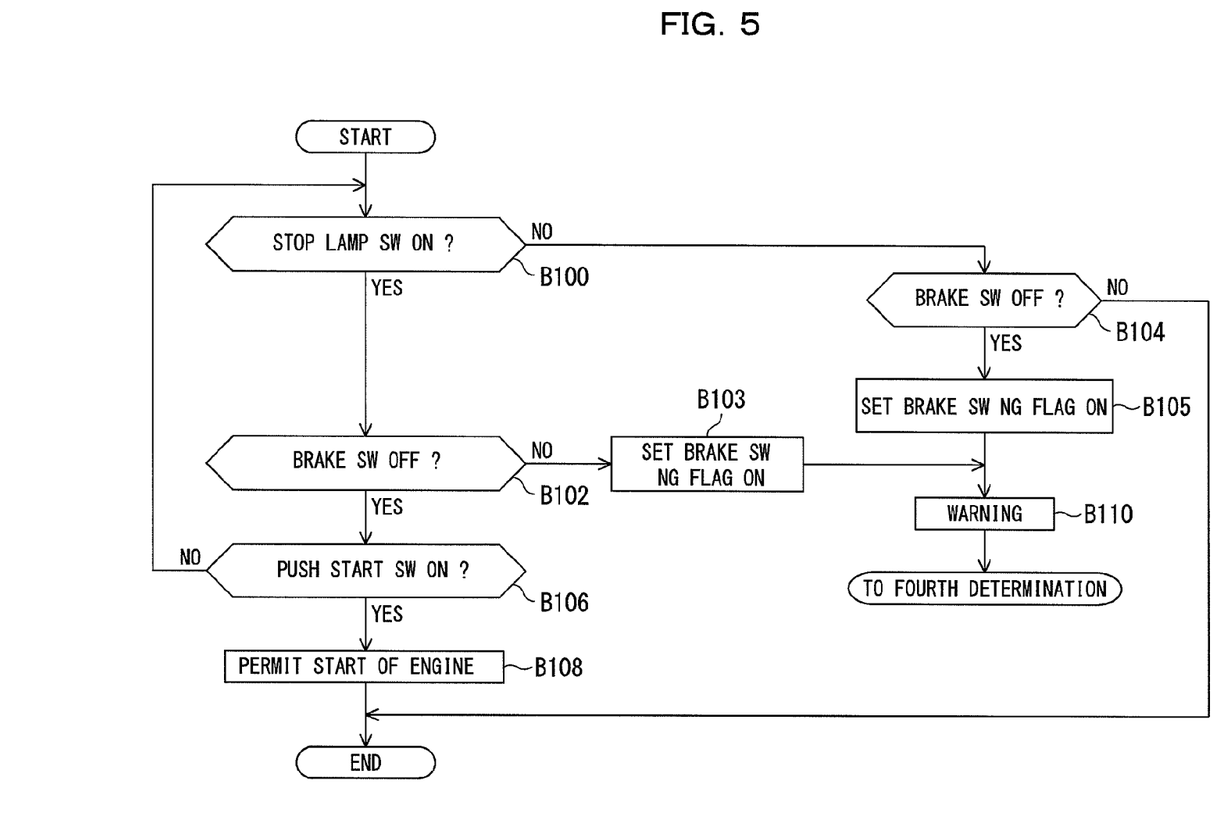
FIG. 5 is a flowchart illustrating a method of controlling a start of a vehicle according to a second embodiment of the present invention.
Figure 6:
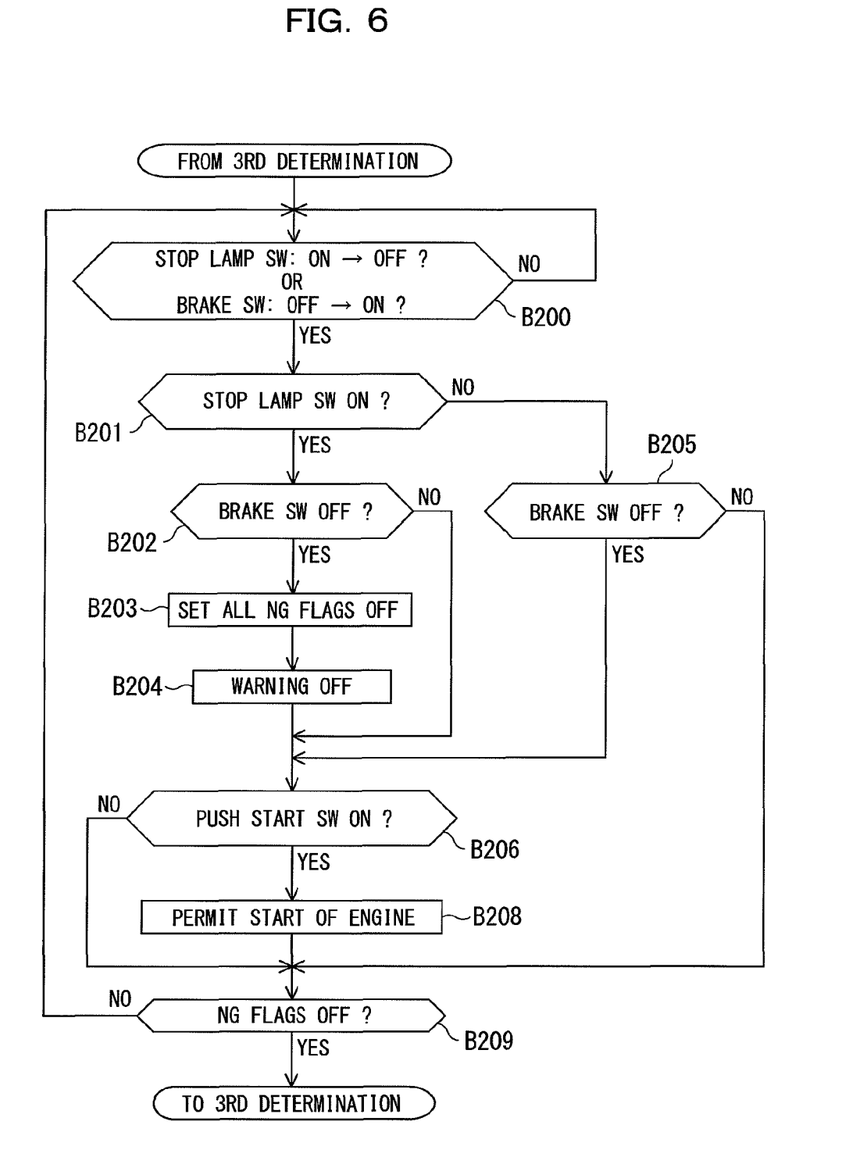
FIG. 6 is a flowchart illustrating a method of controlling a start of a vehicle according to the second embodiment of the present invention.

FIGS. 5 and 6 are flowcharts illustrating a vehicle start control according to a second embodiment. With reference to FIGS. 5 and 6, together with FIGS. 1 and 2, a second embodiment of a vehicle start control apparatus of the present invention will be described.

The present embodiment is different in terms of the configuration of the OSS ECU 20, i.e., the configuration of the software provided as a control program of the computer, but other configurations are same as those in the first embodiment. Only the differences will be described herein.

It is noted that the present embodiment was made in view of most frequent failure of the stop lamp switch 22 and the brake switch 24.

More specifically, for example, while the vehicle is parked, the brake pedal 12 is not depressed and generally the stop lamp switch 22 has been OFF and the brake switch 24 has been ON for a longer period of time. Accordingly, the stop lamp switch 22 is rarely fixed to ON (failure), but frequently fixed to OFF (failure).

Similarly, the brake switch 24 is rarely fixed to OFF (failure), but frequently fixed to ON (failure). Further, disconnection may occur in the switches 22 and 24. For example, if the cable for the brake switch 24 is broken, the brake switch 24 becomes always OFF and depression of the brake pedal 12 is detected even if it is not depressed.

Accordingly, if the stop lamp switch 22 is fixed to ON or the cable for the brake switch 24 is disconnected, depression of the brake pedal 12 is detected even if it is not depressed, which results in a false start of the engine.

The present embodiment is aimed at preventing a false start of the engine due to such a cause.

The OSS ECU 20 stores a control program for performing a start control on the vehicle, depending ON or OFF of the stop lamp switch 22 and the brake switch 24. The start control of the vehicle is performed by the OSS ECU 20 in accordance with the control program.

The KOS ECU 40 performs matching on the ID information in the FOB key 16, and the OSS ECU 20 initiates the start control of the vehicle if the prestored ID information matches the received ID information.

It is noted that the OSS ECU 20 stores how ON/OFF of the two switches 22 and 24 has been changed after the vehicle start control was initiated as a history.

The OSS ECU 20 permits start of the engine if the push start switch 14 is ON when the stop lamp switch 22 is ON and the brake switch 24 is OFF, to start the engine.

In contrast, if the stop lamp switch 22 is OFF and the brake switch 24 is OFF, the OSS ECU 20 sets the NG flag for the stop lamp switch 22 to ON. Then the OSS ECU 20 performs the warning processing and transitions to a fourth determination which will be described later.

Besides, if the stop lamp switch 22 is ON and the brake switch 24 is ON, the OSS ECU 20 sets the NG flag for the brake switch 24 to ON. Then the OSS ECU 20 performs the warning processing and transitions to a fourth determination which will be described later.

The OSS ECU 20 sets all of the NG flags for the two switches 22 and 24 to OFF if the stop lamp switch 22 is ON and the brake switch 24 is OFF, when the stop lamp switch 22 changes from ON to OFF or the brake switch 24 changes from OFF to ON, after execution of the warning processing described above. The OSS ECU 20 terminates the warning processing and permits start of the engine, if the push start switch 14 has been ON for a predetermined period of time.

In contrast, the OSS ECU 20 permits start of the engine if the brake switch 24 is OFF, even if the stop lamp switch 22 is OFF, when the stop lamp switch 22 changes from ON to OFF or the brake switch 24 changes from OFF to ON after execution of the warning processing described above.

Here, the OSS ECU 20 stores a control program for performing a start control on the vehicle, depending ON or OFF of the stop lamp switch 22 and the brake switch 24. Hereinafter, a method of controlling a start of a vehicle performed by the OSS ECU 20 in accordance with the control program will be described with reference to the flowcharts in FIGS. 5 and 6.

The KOS ECU 40 performs matching on the ID information in the FOB key 16, and this processing routine is initiated and is transitioned to step B100 if the prestored ID information matches the received ID information. In Step B100, the OSS ECU 20 determines whether or not the stop lamp switch 22 is ON. If a positive determination is made in this step, the flow transitions to Step B102. Otherwise, if a negative determination is made, the flow transitions to Step B104.

In Step B102, the OSS ECU 20 determines whether or not the brake switch 24 is OFF. If a positive determination is made in this step, the flow transitions to Step B106. Otherwise, if a negative determination is made, the flow transitions to Step B103 wherein the brake switch NG flags is set to ON. After performing a warning in Step B110, the flow transitions to a fourth determination.

On the other hand, in Step B104, the OSS ECU 20 determines whether or not the brake switch 24 is OFF. If a positive determination is made in this step, the flow transitions to Step B105. Otherwise, if a negative determination is made, the processing routine is terminated.

In other words, in Steps B100-102, the OSS ECU 20 determines whether or not the stop lamp switch 22 is ON and the brake switch 24 is OFF. Here, in Step B100-102, the OSS ECU 20 determines whether the stop lamp switch 22 and the brake switch 24 are turned ON or OFF in conjunction with depression of the brake pedal 12 within a predetermined period of time after this processing routine was initiated, that is, whether both the stop lamp switch 22 and the brake switch 24 are functioning properly. If a positive determination is made in the determination in Steps B100-102 (third determination), the flow transitions to Step B106. Otherwise, if a negative determination is made, the flow transitions to Step B103.

In Step B106, the OSS ECU 20 determines whether or not the push start switch 14 is ON. If a positive determination is made, the flow transitions to Step B108. Otherwise, if a negative determination is made, the flow returns to step B100. In Step B108, the OSS ECU 20 electrically connects the ACC 32, the IG plug 36, and the starter motor 38 to the battery 34 by energizing the ACC relay 26, the IG relay 28, and the starter relay 30 to operate the ACC 32, the IG plug 36, and the starter motor 38. Once the IG plug 36 and the starter motor 38 are operated, the engine is started. With than the processing routine is completed at this step.

More specifically, if the stop lamp switch 22 properly changes from OFF to ON in response depression of the brake pedal 12, and the brake switch 24 properly changes from ON to OFF in conjunction with the stop lamp switch 22, the OSS ECU 20 permits start of the engine.

In contrast, the brake switch NG flag is turned on in Step B103 for storing a failure state of the brake switch 24. After performing the processing in Step B110, the flow transitions to the fourth determination. Next, in Step B104, the OSS ECU 20 determines whether or not the brake switch 24 is OFF. If a negative determination is made in this step, the processing is terminated. Otherwise, if a positive determination is made in this step, the flow transitions to Step B105.

In Step B105, the stop lamp switch NG flag is set to ON for storing the failure state of the stop lamp switch 22. Thereafter, in Step B110, the OSS ECU 20 performs a warning processing to turn on the warning light integrated in the push start switch 14, and transitions to the fourth determination.

More specifically, it is considered that the stop lamp switch 22 fails if the stop lamp switch 22 is OFF and the brake switch 24 is OFF, and the stop lamp failure flag is set to ON and the flow transitions to the fourth determination. Otherwise, it is considered that the brake switch 24 fails if the stop lamp switch 22 is ON and the brake switch 24 is ON, and the flow transitions to the fourth determination.

As shown in the flowchart in FIG. 6, in the fourth determination, in Step B200, the OSS ECU 20 determines whether the stop lamp switch 22 changes from ON to OFF, or the brake switch 24 changes from OFF to ON, for checking whether the user has depressed the brake pedal 12 again. If a positive determination is made, the flow transitions to Step B201. Otherwise, if a negative determination is made, the processing routine is terminated. Since the outputs from the switches change from ON to OFF, and then to ON, or change from OFF to ON, then to OFF, in response to the user depressing the brake pedal 12 again, it can be confirmed that at least one of the switches is not fixed to OFF or fixed to ON.

In Step B201, the OSS ECU 20 determines whether or not the stop lamp is ON. If a positive determination is made, the flow transitions to Step B202. Otherwise, if a negative determination is made, the flow transitions to a fifth determination in Step B205.

In Step B202, the OSS ECU 20 determines whether or not the brake switch 24 is OFF. If a positive determination is made, the flow transitions to Step B203. Otherwise, if a negative determination is made, the flow transitions to Step B206.

In Step B203, all NG flags are set to OFF by assuming that the failure state is recovered, and the flow transitions to Step B204.

In Step B204, the warning processing is terminated, and the flow transitions to Step B206.

On the other hand, in a fifth determination on Step B205, the OSS ECU 20 determines whether or not the brake switch 24 is OFF. If a positive determination is made, the flow transitions to Step B206. Otherwise, if a negative determination is made, the flow transitions to Step B209.

In Step B206, the OSS ECU 20 determines whether or not the push start switch 14 has been OFF for a predetermined period of time. If a positive determination is made, start of the engine is permitted in Step B208 and then the flow transitions to Step B209. Otherwise, if a negative determination is made, the flow transitions to Step B209.

In Step B209, the OSS ECU 20 determines whether or not the all of the NG flags are OFF. If a positive determination is made, the flow transitions to a third determination. Otherwise, if a negative determination is made, the processing starting from Step B200 is repeated.

In other words, when the push start switch 14 is operated in the situation where the stop lamp switch 22 is turned OFF and the brake switch 24 is turned OFF in response to the brake pedal 12 being depressed again after the execution of the warning processing, the OSS ECU 20 stores the failure state of the stop lamp switch 22 and permits start of the engine. In such a situation, while the brake switch 24 correctly changes from ON to OFF in response to a depression of the brake pedal 12, the stop lamp switch 22 experiences the so-called OFF failure (fixed to OFF) wherein the stop lamp switch 22 never changes from the OFF state. Thus, the OSS ECU 20 performs the warning processing and permits start of the engine.

On the other hand, when the push start switch 14 is operated in the situation where the stop lamp switch 22 is turned ON and the brake switch 24 is turned ON in response to the brake pedal 12 being depressed again within the above-described predetermined period of time after the execution of the warning processing, the OSS ECU 20 stores the failure state of the brake switch 24 and permits start of the engine. In such a situation, while the stop lamp switch 22 correctly changes from OFF to ON in response to a depression of the brake pedal 12, the brake switch 24 experiences the so-called ON failure (fixed to ON) wherein the brake switch 24 never changes from the ON state. Thus, the OSS ECU 20 permits start of the engine after the determinations of Steps B201-205. In such a situation, while the stop lamp switch 22 correctly changes from OFF to ON in response to a depression of the brake pedal 12, the brake switch 24 experiences the so-called ON failure (fixed to ON) wherein the brake switch 24 never changes from the ON state. Thus, the OSS ECU 20 performs the warning processing and permits start of the engine.

Accordingly, the vehicle start control apparatus 10 according to this embodiment can prevent the engine from being started, bypassing execution of the warning processing, when the brake pedal 12 is not depressed. Further, if either the stop lamp switch 22 or the brake switch 24 fails, the warning processing is performed and start of the engine can be permitted when the user depresses the brake pedal 12 once again and the push start switch is operated.

Further, in the vehicle start control apparatus 10 according to this embodiment, if the OSS ECU 20 determines that the stop lamp switch 22 is OFF and the brake switch 24 is OFF in the determinations in Steps B201 and 205, that is, the brake switch 24 correctly switches in response to the second depression of the brake pedal 12 but the stop lamp switch 22 is OFF failed, the flow transitions to Step B206. Accordingly, the vehicle start control apparatus 10 according to this embodiment can prevent start of the engine from being continuously blocked due to an OFF failure of the stop lamp switch 22 even when the brake pedal 12 is being depressed.

Further, in the vehicle start control apparatus 10 according to this embodiment, if the OSS ECU 20 determines that the stop lamp switch 22 is ON and the brake switch 24 is ON in the fourth determination in Steps B201 and 202, that is, the stop lamp switch 22 correctly switches in response to the second depression of the brake pedal 12 but the brake switch 24 is ON failed, the flow transitions to Step B206. Accordingly, the vehicle start control apparatus 10 according to this embodiment can prevent start of the engine from being continuously blocked due to an ON failure of the brake switch 24 even when the brake pedal 12 is being depressed.

Further, in the vehicle start control apparatus 10 according to this embodiment, an ON failure and an OFF failure of the stop lamp switch 22 can be detected based on two depressions of the brake pedal 12, i.e., an operation routinely made by the driver, rather than special operations, such as a depression of the push start switch 14 for longer than a predetermined period of time (so-called "press and hold"). Accordingly, the drive's operation can be simplified for starting the engine when the stop lamp switch 22 fails. Further, since the engine is started in response to two depressions of the brake pedal 12, which is a routine operation made by the driver, it is expected that blocking of start of the engine can be canceled even if the driver does not know the operation to start the engine upon the failure of the stop lamp switch 22.

(Third Embodiment)

Figure 7:
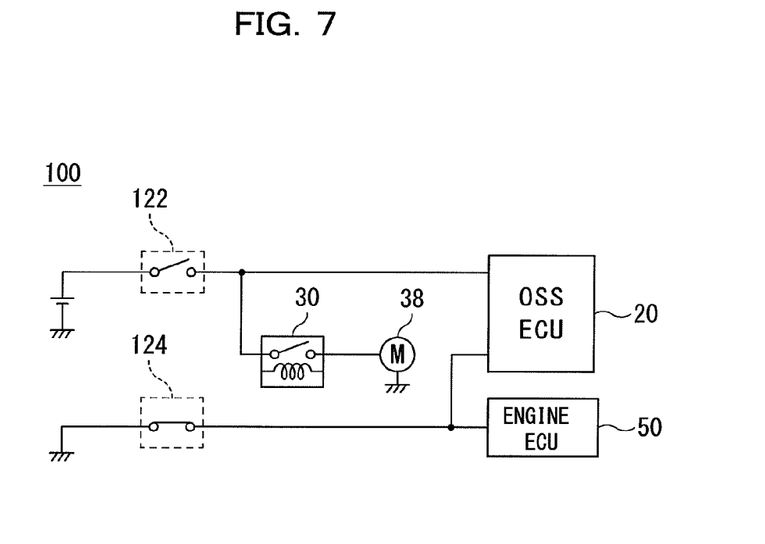
FIG. 7 is a block diagram illustrating the configuration of an OSS of a vehicle start control apparatus according to a third embodiment of the present invention.
Figure 8:
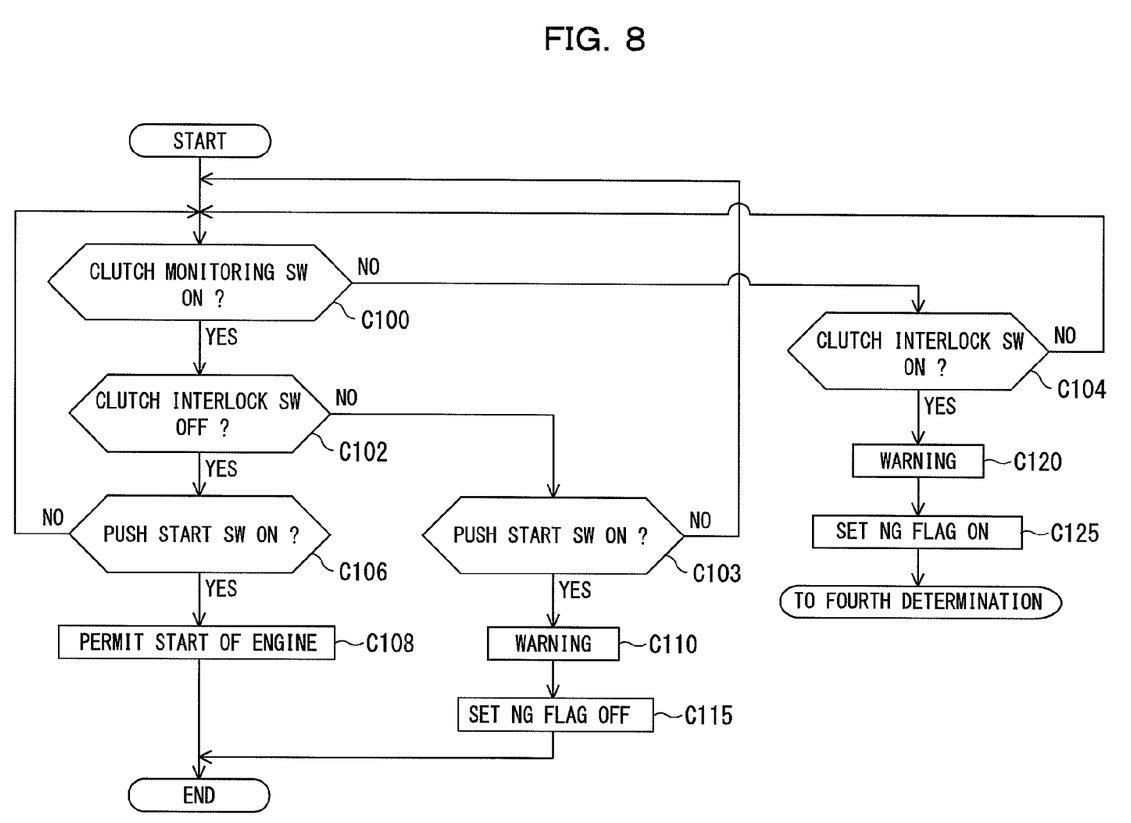
FIG. 8 is a flowchart illustrating a method of controlling a start of a vehicle according to the third embodiment of the present invention.
Figure 9:
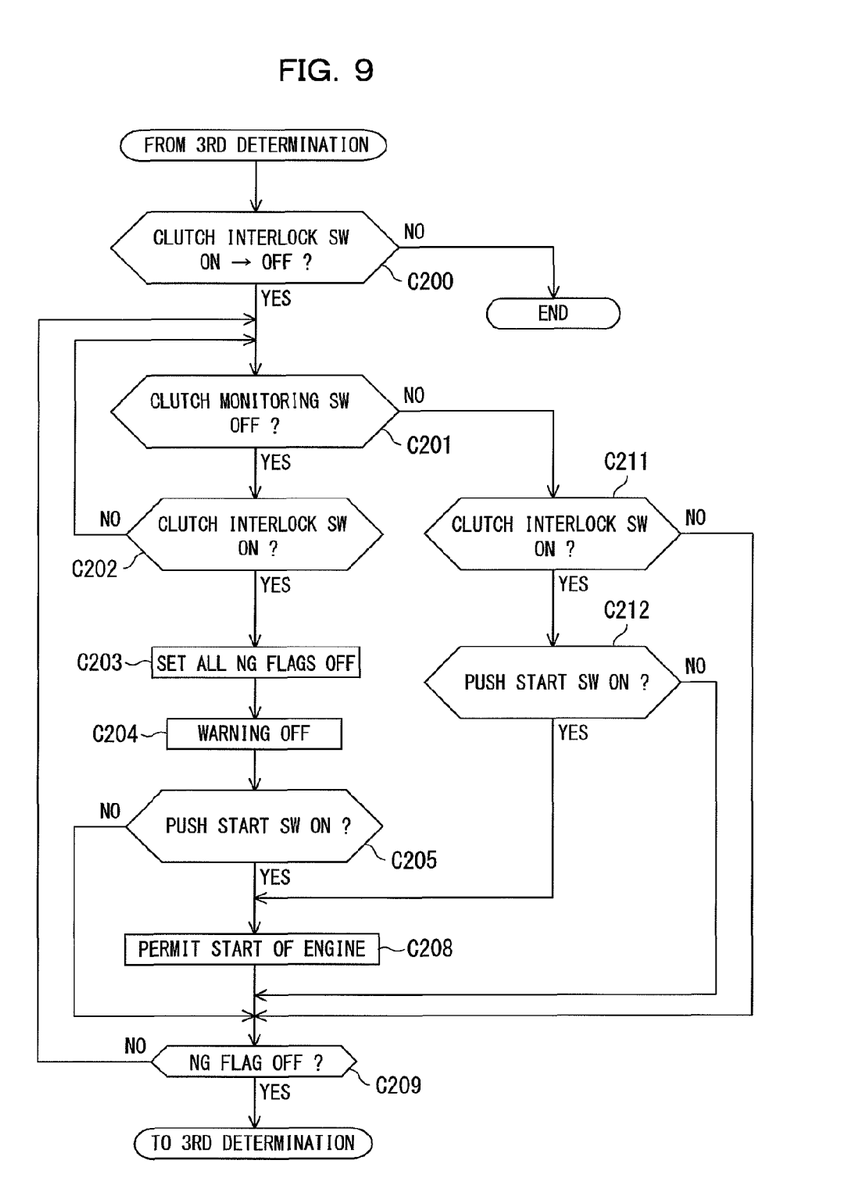
FIG. 9 is a flowchart illustrating the method of controlling a start of a vehicle according to the third embodiment of the present invention.

FIGS. 7 to 9 illustrate a vehicle start apparatus as a third embodiment of the present invention. FIG. 7 is a block diagram illustrating the configuration of the OSS of a vehicle start control apparatus 100 according to the third embodiment, and FIGS. 8 and 9 are flowcharts illustrating a method for controlling a start of a vehicle.

The vehicle start control apparatus 100 is an apparatus used in a MT (Manual Transmission) vehicle, wherein an OSS and a KOS are employed. More specifically, the vehicle start control apparatus 100 starts an engine in response to a depression of a push start switch 14 while a clutch pedal is depressed by a driver.

The vehicle start control apparatus 100 includes a clutch interlock switch 122 (first switch) and a clutch monitoring switch 124 (second switch). The clutch interlock switch 122 is a switch which is turned ON while the clutch pedal is being depressed, or is turned OFF while the clutch pedal is not depressed. In response to the clutch interlock switch 122 being turned ON, the starter relay 30 is turned ON and the battery 34 and the starter motor 38 are electrically connected each other.

The clutch monitoring switch 124 is a switch provided in the cruise control system, and is turned OFF (a first state) while the clutch pedal is being depressed, or is turned ON (a second state) while the clutch pedal is not depressed. The engine ECU 50 performs a cruise control while the clutch monitoring switch 124 is ON.

The clutch interlock switch 122 and the clutch monitoring switch 124 are switches turned ON or OFF in conjunction with operation of the clutch pedal. The clutch interlock switch 122 and the clutch monitoring switch 124 are toggle switches turned ON or OFF in conjunction with each other. More specifically, the clutch monitoring switch 124 is turned off when the clutch interlock switch 122 is ON, whereas the clutch monitoring switch 124 is turned ON when the clutch interlock switch 122 is OFF.

Here, the OSS ECU 20 stores a control program for performing a start control on the vehicle, depending whether the clutch interlock switch 122 and the clutch monitoring switch 124 are ON or OFF. Hereinafter, the start control of the vehicle performed by the OSS ECU 20 in accordance with the control program will be described with reference to the flowcharts in FIGS. 8 and 9.

The KOS ECU 40 performs matching on the ID information in the FOB key 16, and a processing routine of the start control of the vehicle is initiated by the OSS ECU 20 and is transitioned to step C100 if the prestored ID information matches the received ID information.

In Step C100, the OSS ECU 20 determines whether or not the clutch monitoring switch 124 is ON. If a positive determination is made in the determination of this step, the flow transitions to Step C102. Otherwise, if a negative determination is made in the determination of this step, the flow transitions to Step C104.

In Step C102, the OSS ECU 20 determines whether or not the clutch interlock switch 122 is OFF. If a positive determination is made in the determination of this step, the flow transitions to Step C 106. Otherwise, if a negative determination is made, the flow transitions to Step C 103.

In Step C106, the OSS ECU 20 determines whether or not the push start switch 14 is ON. If a positive determination is made in the determination of this step, the flow transitions to Step C108 to permit start of the engine. Otherwise, if a negative determination is made, start of the engine is not permitted and the flow returns to Step C100.

On the other hand, in Step C103, the OSS ECU 20 determines whether or not the push start switch 14 is ON. If a positive determination is made in the determination of this step, the warning processing in Step C110 is performed. After the flow transitions to Step C115 to set the NG flag to ON, the processing is terminated. Otherwise, if a negative determination is made, the flow returns to Step C100.

On the other hand, in Step C104, the OSS ECU 20 determines whether or not the clutch interlock switch 122 is ON. If a positive determination is made in the determination of this step, the warning processing in Step C120 is performed. After the flow transitions to Step C125 to set the NG flag to ON, the flow transitions to the fourth determination.

As shown in the flowchart in FIG. 9, in the fourth determination, firstly in the Step C200, the OSS ECU 20 determines whether or not the clutch interlock switch 122 changes from ON to OFF. If a positive determination is made in the determination of this step, the flow transitions to Step C201. Otherwise, if a negative determination is made, the processing is terminated.

In Step C201, the OSS ECU 20 determines whether or not the clutch monitoring switch 124 is OFF. If a positive determination is made in the determination of this step, the flow transitions to Step C202. Otherwise, if a negative determination is made, the flow transitions to Step C211.

In Step C202, the OSS ECU 20 determines whether or not the interlock monitoring switch 122 is turned ON. If a positive determination is made in the determination of this step, all of the NG flags are set to OFF in Step C203. The warning is turned OFF and the flow transitions to Step C205. Otherwise, if a negative determination is made, Step C201 is performed again.

In Step C205, the OSS ECU 20 determines whether or not the push start switch 14 is ON. If a positive determination is made in the determination of this step, the flow transitions to Step C208 to permit start of the engine and then transitions to Step C209.

On the other hand, in Step C211, it is determined whether or not the clutch interlock switch 122 is ON. If a positive determination is made in the determination of this step, the flow transitions to Step C212. Otherwise, if a negative determination is made, the flow transitions to Step C209.

In Step C212, the OSS ECU 20 determines whether or not the push start switch 14 is ON. If a positive determination is made in the determination of this step, the flow transitions to Step C208 to permit start of the engine and then transitions to Step C209.

In other words, the clutch interlock switch 122 changes from ON to OFF and the clutch interlock switch 122 is turned ON while the clutch monitoring switch 124 is ON and if the push start switch 14 is turned ON, within the above-described predetermined period of time after execution of the warning processing, it is determined that the clutch monitoring switch 124 fails and an permission to start the engine is issued.

Thereby, block of an engine start is prevented by a failure of the clutch monitoring switch 124 alone.

Accordingly, the vehicle start control apparatus 100 according to this embodiment can prevent the engine from being started, bypassing execution of the warning processing, when the clutch 12 is not depressed.

[Others]

Although embodiments of the present invention have been described, the present invention is not limited to the embodiments described above and various modifications may be made without departing from the spirit of the present invention. For example, although the brake switch 24 or the clutch monitoring switch 124 is used as the second switch in the above-described embodiments, other switches which are turned ON or OFF in response to the pedals, such as the brake pedal 12 or the clutch pedal, may also be used. Further, although a switch which is turned OFF in response to a depression of a pedal, such as the brake pedal 12 or the clutch pedal, and is turned ON in response to release of the depression of the pedal, as the second switch in the above-described embodiments, other switches which are turned ON in response to the depression or turned OFF in response to the depression, may also be used.

Note that those ordinary skilled in the art can practice the vehicle start apparatus of the present invention from the disclosure of embodiments of the present invention.

INDUSTRIAL APPLICABILITY

The present invention is applicable to controls on any other machines than vehicles, which include a switch that is turned ON or OFF in response to an operation by an operator, and are started by monitoring the ON/OFF state of that switch.

What is claimed is:

1. A vehicle start control apparatus that starts an engine when an engine start switch is operated while a pedal is being depressed, the vehicle start control apparatus comprising:
    a first switch that is turned ON in response to a depression of the pedal, and is turned OFF in response to the depression of the pedal being released;
    a second switch that assumes a first state being one of ON and OFF in response to the depression of the pedal, and assumes a second state being the other of ON and OFF in response to the depression of the pedal being released; and
    a control unit that performs a first determination to determine whether or not the first switch is ON and the second switch is in the first state; starts the engine if a positive determination is made in the first determination and if the engine start switch is operated; and after determining whether or not the pedal is depressed twice by determining whether or not the first switch changes from ON to OFF, and then to ON, or from OFF to ON, and then to OFF, and determining whether the second switch changes from ON to OFF, and then to ON, or from OFF to ON and then to OFF, after a negative determination is made in the first determination, perform a second determination to determine whether or not at least one of the first switch and the second switch used for the determination of whether the pedal is depressed twice indicates the depression of the pedal, and starts engine, if a positive determination is made in the second determination and if the engine start switch is operated.

2. The vehicle start control apparatus according to claim 1, wherein the first switch is a stop lamp switch to turn on or off a stop lamp, and the second switch is a brake switch to disable a cruise control function in the first state.

3. The vehicle start control apparatus according to claim 1, wherein the first switch is a clutch interlock switch to electrically connect or disconnect between a starter motor and a power source, and the second switch is a clutch monitoring switch to disable a cruise control function in the first state.

4. A vehicle start control apparatus that starts an engine when an engine start switch is operated while a pedal is being depressed, the vehicle start control apparatus comprising:
    a first switch that is turned ON in response to a depression of the pedal, and is turned OFF in response to the depression of the pedal being released;
    a second switch that assumes a first state being one of ON and OFF in response to the depression of the pedal, and assumes a second state being the other of ON and OFF in response to the depression of the pedal being released; and
    a control unit that performs a first determination to determine whether or not the first switch is ON and the second switch is in the first state; starts the engine, if a positive determination is made in the first determination and if the engine start switch is operated; and after determining whether or not the pedal is depressed twice by determining whether or not the first switch changes from ON to OFF, and then to ON, or from OFF to ON, and then to OFF, and determining whether the second switch changes from ON to OFF, and then to ON, or from OFF to ON and then to OFF, after a negative determination is made in the first determination, performs a second determination to determine whether or not the first switch is ON and the second switch is in the second state, and starts the engine, if a positive determination is made in the second determination and if the engine start switch is operated.

5. The vehicle start control apparatus according to claim 4, wherein the control unit, after determining whether or not the pedal is depressed twice by determining whether or not the first switch or the second switch changes from ON to OFF, and then to ON, or from OFF to ON, and then to OFF after the negative determination is made in the first determination, performs a third determination to determine whether or not the first switch is OFF and the second switch is in the first state, and starts the engine if a positive determination is made in the third determination and if the engine start switch is operated.

6. The vehicle start control apparatus according to claim 5, wherein the first switch is a stop lamp switch to turn on or off a stop lamp, and the second switch is a brake switch to disable a cruise control function in the first state.

7. The vehicle start control apparatus according to claim 5, wherein the first switch is a clutch interlock switch to electrically connect or disconnect between a starter motor and a power source, and the second switch is a clutch monitoring switch to disable a cruise control function in the first state.

* * * * *